US008719952B1

(12) United States Patent
Damm-Goossens

(10) Patent No.: US 8,719,952 B1
(45) Date of Patent: May 6, 2014

(54) SYSTEMS AND METHODS USING PASSWORDS FOR SECURE STORAGE OF PRIVATE KEYS ON MOBILE DEVICES

(75) Inventor: Andre Damm-Goossens, Las Vegas, NV (US)

(73) Assignee: Secsign Technologies Inc., Henderson, NV (US)

( * ) Notice: Subject to any disclaimer, the term of this patent is extended or adjusted under 35 U.S.C. 154(b) by 0 days.

(21) Appl. No.: 13/430,534

(22) Filed: Mar. 26, 2012

Related U.S. Application Data

(60) Provisional application No. 61/467,895, filed on Mar. 25, 2011.

(51) Int. Cl.
*G06F 21/00* (2013.01)
*H04L 9/32* (2006.01)

(52) U.S. Cl.
CPC .................................. *H04L 9/3226* (2013.01)
USPC .............................. 726/28; 713/185; 380/285

(58) Field of Classification Search
CPC ..................................................... H04L 9/3226
USPC ........................................................ 713/155
See application file for complete search history.

(56) References Cited

U.S. PATENT DOCUMENTS

| 5,201,000 | A  * | 4/1993  | Matyas et al. ................... 380/30 |
| 6,181,795 | B1   | 1/2001  | Chandersekaran et al. |
| 6,335,972 | B1   | 1/2002  | Chandersekaran et al. |
| 6,718,468 | B1 * | 4/2004  | Challener et al. ............. 713/184 |
| 6,931,526 | B1 * | 8/2005  | Bacha et al. ................... 713/151 |
| 6,950,523 | B1   | 9/2005  | Brickell et al. |
| 6,970,562 | B2   | 11/2005 | Sandhu et al. |
| 7,562,221 | B2   | 7/2009  | Nystrom et al. |
| 7,660,421 | B2   | 2/2010  | Hopkins et al. |
| 7,778,934 | B2   | 8/2010  | Graves et al. |
| 7,949,880 | B2   | 5/2011  | Champine et al. |
| 8,225,095 | B2 * | 7/2012  | Funk .............................. 713/171 |
| 8,284,942 | B2 * | 10/2012 | Cantwell et al. ............... 380/277 |
| 2002/0067832 | A1 * | 6/2002  | Jablon ........................... 380/277 |
| 2004/0068650 | A1 * | 4/2004  | Resnitzky et al. ............. 713/155 |

(Continued)

OTHER PUBLICATIONS

Verisign, "Identity Protection Mobile Center," p. 1, Symantec Corp., Mountain View, CA, downloaded from vipmobile.verisign.com on Dec. 7, 2010.

(Continued)

*Primary Examiner* — Hadi Armouche
*Assistant Examiner* — Bryan Wright
(74) *Attorney, Agent, or Firm* — Law Office of Andrei D Popovici, PC

(57) ABSTRACT

The public key of an RSA (asymmetric) software key pair is maintained confidentially on an authentication server, while the corresponding private key is maintained in encrypted, unstructured form on a mobile communication device (e.g. smartphone). The mobile device cannot verify locally whether a decrypted private key is correct, and a brute force, dictionary, or other attack that yields the correct private key among many decrypted keys does not allow determining which private key is correct without access to the authentication server. A relatively-long (128+ bit, e.g. 512-bit) public key exponent is used to make brute-force local verification of the private key impractical. The unstructured private key can secure other resources such as RSA keys used for digital signing. The enhanced security provided for the private key adds computational and logistical cost, but is of particular use if the mobile device controls access to external resources such as secure websites.

22 Claims, 13 Drawing Sheets

(56) References Cited

U.S. PATENT DOCUMENTS

| | | | |
|---|---|---|---|
| 2005/0250478 A1* | 11/2005 | Brown et al. | 455/412.1 |
| 2006/0182283 A1 | 8/2006 | Sandhu et al. | |
| 2008/0120504 A1* | 5/2008 | Kirkup et al. | 713/176 |
| 2009/0029677 A1 | 1/2009 | Choi et al. | |
| 2009/0282247 A1 | 11/2009 | Kirkup et al. | |
| 2013/0024695 A1* | 1/2013 | Kandrasheu et al. | 713/175 |

OTHER PUBLICATIONS

Arcot, "Arcot ID," p. 1, CA Technologies, Islandia, NY, downloaded from arcot.com on Jan. 4, 2011.

Valimo, "Valimo Mobile ID Overview," p. 1, Valimo Wireless, Vantaa, Finland, downloaded from valimo.com on Dec. 7, 2010.

Safenet, "SMS Authentication," p. 1-5, SafeNet, Inc., Belcamp, MD, downloaded from safenet-inc.com on Jan. 4, 2011.

Tsirulnik, G., "RSA Launches Mobile Authentication Service," p. 1-2, Mobile Marketer, New York, NY, May 30, 2008.

Kobil, "SecOVID Soft Token," p. 1, Kobil Systems GmbH, Worms, Germany, downloaded from kobil.com on Jan. 4, 2011.

Encap, "How Does it Work? How is it Different?" p. 1-4, Encap AS, Fornebu, Norway, downloaded from encap.no. on Dec. 7, 2010.

Damm-Goossens, U.S. Appl. No. 13/371,357, filed Feb. 10, 2012.

* cited by examiner

FIG. 8-A

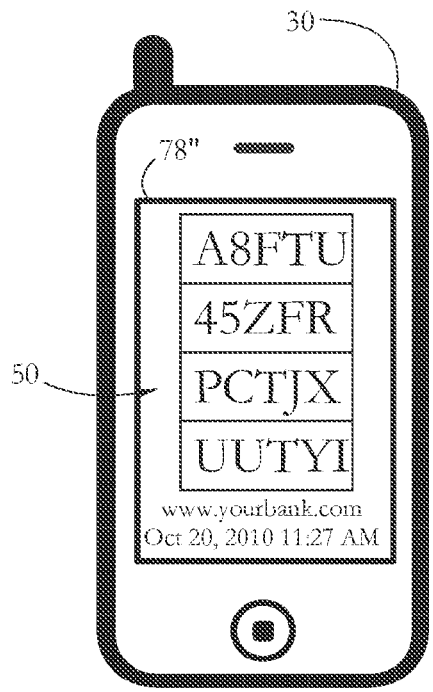
FIG. 8-B
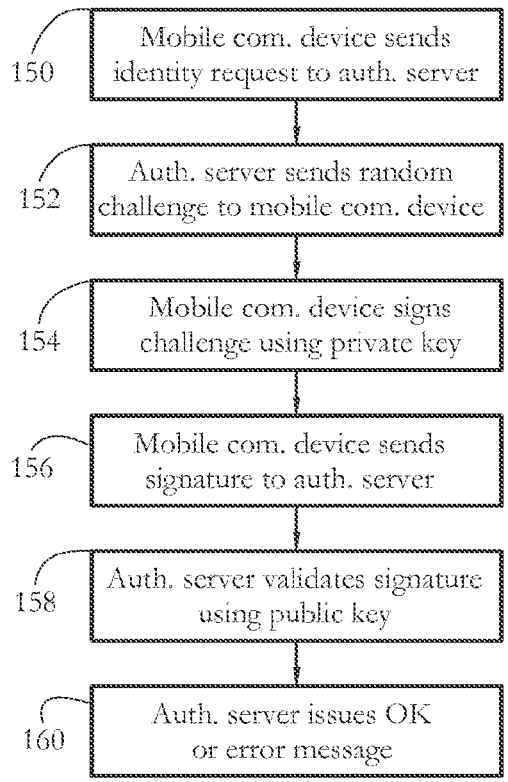
FIG. 9

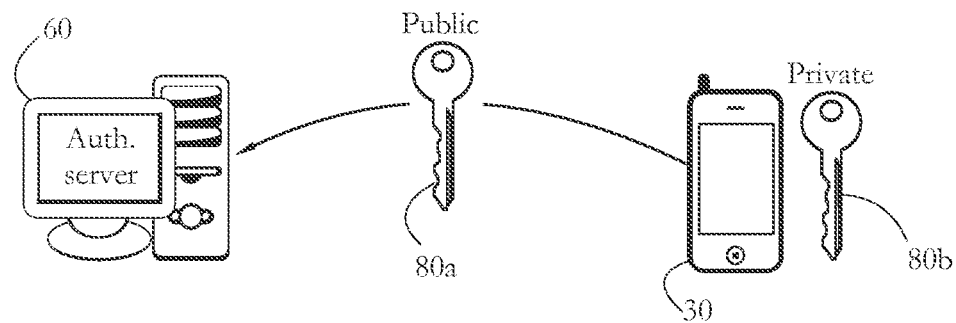
FIG. 10
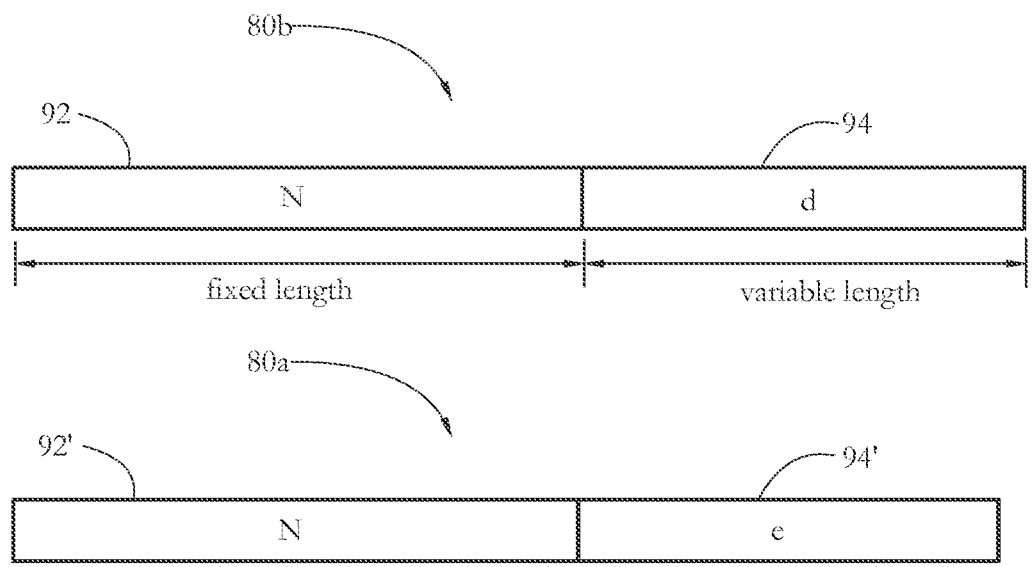
FIG. 11-A

PKCS#8 Format :

RSAPrivateKey ::= SEQUENCE
{
version Version,
modulus INTEGER, -- n
publicExponent INTEGER, -- e
privateExponent INTEGER, -- d
prime1 INTEGER, -- p
prime2 INTEGER, -- q
exponent1 INTEGER, -- d mod (p-1)
exponent2 INTEGER, -- d mod (q-1)
coefficient INTEGER -- (inverse of q) mod p
} *
Version ::= INTEGER *
The fields of type RSAPrivateKey have the following meanings:
version is the version number, for compatibility with future revisions of this document. It shall be 0 for this version of the document.
modulus is the modulus n.
publicExponent is the public exponent e.
privateExponent is the private exponent d.
prime1 is the prime factor p of n.
prime2 is the prime factor q of n.
exponent1 is d mod (p-1).
exponent2 is d mod (q-1).
coefficient is the Chinese Remainder Theorem coefficient q-1 mod p.

FIG. 11-B

SYSTEMS AND METHODS USING PASSWORDS FOR SECURE STORAGE OF PRIVATE KEYS ON MOBILE DEVICES

RELATED APPLICATION DATA

This application claims the benefit of the filing date(s) of U.S. Provisional Patent Application No. 61/467,895, filed Mar. 25, 2011, which is herein incorporated by reference.

BACKGROUND

The invention relates to systems and methods for authenticating users of computer systems, and in particular to systems and methods for encryption using asymmetric software key(s).

Authentication applications typically rely on one or more encryption algorithms. In symmetric-key encryption algorithms, the sender and receiver share a common, secret key which is used for both encryption and decryption. Such algorithms generally require that the symmetric key be shared in a secure way, for example through a secure communication channel, between the sender and receiver before any encrypted content is transmitted.

Public-key (asymmetric) algorithms such as the RSA (Rivest, Shamir, Adleman) algorithm employ a key pair including two related but distinct keys: a public key, which may be known to potential attackers, and a private key, which is kept secret by its owner. In the RSA encryption scheme, the public key includes a modulus N and a public exponent e, while the private key includes the modulus N and a private exponent d. The modulus N is the product of two large prime numbers, p and q. The public exponent e is relatively prime to the product $(p-1)(q-1)$. The private exponent is $d=e^{-1}$ mod $((p-1)(q-1))$. Someone in possession of the public key encrypts a readable (e.g. plaintext) message m to generate a ciphertext message c using the encryption operator $c=m^e$ mod N. The plaintext message m can be recovered by the owner of the corresponding private key using the decryption operator $m=c^d$ mod N. The security of the scheme relies on the computational asymmetry of multiplication and factorization: it is relatively easy to compute the product of two large primes, $N=pq$, but significantly more expensive computationally to determine the prime factors of a given large number N. Thus, even if an attacker knows the modulus N and public exponent e contained in a public key, it is computationally difficult for such an attacker to determine the factors p and q, or otherwise determine the private exponent d necessary to decrypt messages encrypted with that public key.

Asymmetric key pairs may also be used to digitally sign documents. To sign a document, a hashing function is applied to the document to generate a hash of the document, and the hash is encrypted using the signer's private key to generate a signature. A message recipient decrypts the signature using the signer's public key, separately applies the same hashing function to the document to generate the hash of the document, and compares the resulting hash and decrypted signature. If the two hashes are identical, the signature is deemed valid.

The design of secure communications systems is commonly affected by tradeoffs between security and usability. Increasing system security often involves imposing additional burdens on users, which may reduce system usability. At the same time, the security of such systems depends on the security of the private key. In one approach to securing the private key, the private key is embedded in hardware or other tamper-proof environment, so that potential attackers do not have ready access to the private key contents even if they gain physical control of the device containing the key. Securing private keys may be significantly more difficult if the keys are maintained in software, particularly on systems such as smartphones which may be stolen or may otherwise come under the physical control of an attacker. Even if the private key is encrypted and a user password is required for its use, a determined attacker may employ various kinds of attacks such as brute force, dictionary, or personal data attacks to gain access to the private key. If the value of the key is sufficiently high, an attacker may employ significant computational resources to break the key's protections.

SUMMARY

According to one aspect, a mobile communication device comprises at least one processor, the mobile communication device being configured to: perform an authentication initialization sequence; receive from an authentication server computer system a login session authentication confirmation request generated in response to a user request to log into a service provider; receive a user input indicating a user authorization of the user request to log into the service provider; and decrypt the private key, and employ the decrypted private key to securely send to the authentication server computer system an indicator of the user's acceptance of the login session authentication confirmation request. The authentication initialization sequence comprises generating an asymmetric public key cryptography key pair comprising a private key and a corresponding public key; transmitting the public key to an authentication server system for storage; in response to transmitting the public key to the authentication server system, removing all copies of the public key from the mobile communication device, to prevent an attacker who has gained unauthorized access to the mobile communication device from gaining access to the public key; and storing on the mobile communication device the private key in an encrypted, unstructured form, the private key consisting essentially of a modulus N and a private exponent d.

According to another aspect, an authentication server computer system comprises at least one processor, the authentication server computer system being configured to: communicate with a mobile communication device of a user to authenticate the mobile communication device as authorized to validate a user login session by a user client computer system on a service provider server; send to the mobile communication device a request for user validation of the user login session on the service provider server; in response to sending to the mobile communication device the request for user validation of the user login session, receive from the mobile communication device a user acceptance of the request for user validation of the user login session; and in response to authenticating the mobile communication device and receiving the user acceptance, send to the service provider an indicator of the user's acceptance, for allowing the user client computer system access to a restricted resource on the service provider server. Authenticating the mobile communication device comprises: receiving from the mobile communication device a token encrypted using a decrypted private key, the decrypted private key being generated by decrypting using a user-entered password a private key stored on the mobile communication device in encrypted, unstructured form, the private key and a public key forming an asymmetric public key cryptography key pair, and confirming that the user-entered password is correct by verifying that the public key corresponds to the decrypted private key.

According to another aspect, a method comprises employing a mobile communication device comprising at least one processor to: generate an asymmetric public key cryptography key pair including a private key and a public key, the private key including a modulus and a private exponent, the public key including the modulus and a public exponent; store the private key in encrypted, unstructured form on the mobile communication device; transmit the public key for storage on an authentication server connected to the mobile communication device over a wide area network; receive a user-entered password to decrypt the encrypted private key, and in response verifying that the user-entered password is correct by: sending to the authentication server a token encrypted using a decrypted private key, the decrypted private key being generated by decrypting the encrypted private key using the user-entered password, and receiving from the authentication server a confirmation that the user-entered password is correct, the confirmation that the user-entered password is correct being indicative of a confirmation by the authentication server that the public key stored by the authentication server corresponds to the decrypted private key.

According to another aspect, a mobile communication device comprises at least one processor, the mobile communication device being configured to: generate an asymmetric public key cryptography key pair including a private key and a public key, the private key including a modulus and a private exponent, the public key including the modulus and a public exponent; store the private key in encrypted, unstructured form on a mobile communication device; transmit the public key for storage on an authentication server connected to the mobile communication device over a wide area network; receive from a user a user password to decrypt the encrypted private key, and in response verifying that the received user password is correct by: sending to the authentication server a token encrypted using a decrypted private key, the decrypted private key being generated by decrypting the encrypted private key using the received user password, and receiving from the authentication server a confirmation that the received user password is correct, the confirmation that the entered user password is correct being indicative of a confirmation by the authentication server that the public key stored by the authentication server corresponds to the decrypted private key.

According to another aspect, a method comprises employing at least one processor to: store at an authentication server a public key of an asymmetric public key cryptography key pair, the key pair including the public key and a private key, the private key including a modulus and a private exponent, the public key including the modulus and a public exponent; receive an encrypted token at the authentication server from a mobile communication connected to the authentication server over a wide area network, the encrypted token being encrypted by the mobile communication device using a decrypted private key, the decrypted private key being generated by decrypting, using a user-entered password, an encrypted private key stored on the mobile communication device in encrypted, unstructured form; and in response to verifying at the authentication server that the public key corresponds to the decrypted private key, send to the mobile communication device a confirmation that the user-entered password is correct.

According to another aspect, an authentication server computer system comprises at least one processor, the authentication server computer system being configured to: store a public key of an asymmetric public key cryptography key pair, the key pair including the public key and a private key, the private key including a modulus and a private exponent, the public key including the modulus and a public exponent; receive an encrypted token from a mobile communication connected to the authentication server over a wide area network, the encrypted token being encrypted by the mobile communication device using a decrypted private key, the decrypted private key being generated by decrypting, using a user-entered password, an encrypted private key stored on the mobile communication device in encrypted, unstructured form; and in response to verifying that the public key corresponds to the decrypted private key, send to the mobile communication device a confirmation that the user-entered password is correct.

BRIEF DESCRIPTION OF THE DRAWINGS

The foregoing aspects and advantages of the present invention will become better understood upon reading the following detailed description and upon reference to the drawings where:

FIG. 8-B shows another mobile communication device Ticket ID display according to some embodiments of the present invention.

FIG. 9 illustrates a challenge-response sequence of steps according to some embodiments of the present invention.

FIG. 10 illustrates a public key transfer to an authentication server from a mobile communication device according to some embodiments of the present invention.

FIG. 11-A illustrates an exemplary asymmetric key pair including a public key and private key according to some embodiments of the present invention.

FIG. 11-B illustrates the syntax for an exemplary PKCS#8 format used to structure private keys in some secure communications systems.

DETAILED DESCRIPTION OF PREFERRED EMBODIMENTS

Figure 1:
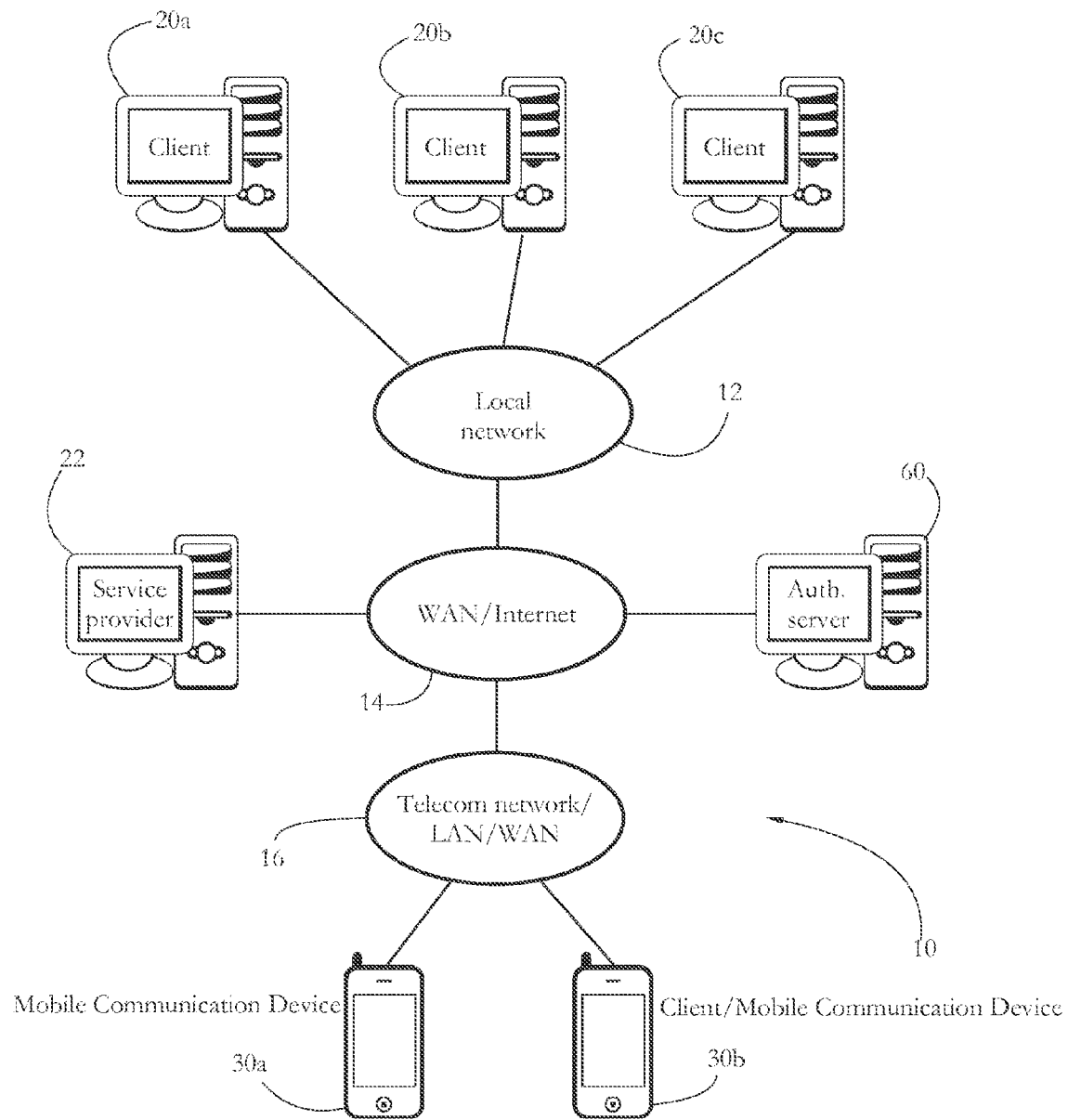
FIG. 1 shows an identity authentication system according to some embodiments of the present invention.

Systems and methods described herein may include or employ one or more interconnected computer systems and/or mobile communication devices comprising one or more processors and associated memory, storage, input and display devices. Such computer systems and/or mobile communication devices may run software implementing methods described herein when executed on hardware. According to some embodiments, mobile communication devices include mobile telephones such as smartphones. In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A claim recitation of an element consisting essentially of a set of structures is understood to mean that the element includes only the recited set of structures, and optionally other structures that do not materially affect the basic and novel characteristics of the claim. For example, the statement that a private key stored on a mobile communication device consists essentially of a modulus and a private exponent means that the private key includes only the modulus and private exponent, and optionally other data (e.g. nonsense or filler data) which would not allow an attacker who has gained access to the private key in encrypted form to readily distinguish successful and unsuccessful attempts to decrypt the private key without access to a remote server system or other information external to the private key. The term "public key" is a known term in the field of public-key cryptography, referring to one key of a private-public key pair; as will be apparent from the ensuing description, the described public keys need not be, and at least in some embodiments are not, made publicly available, but may be maintained confidentially on a server. A wide area network is a network, such as the Internet, that includes at least one router. Computer programs described in some embodiments of the present invention may be stand-alone software entities or sub-entities (e.g., subroutines, code objects) of other computer programs. Computer readable media encompass storage (non-transitory) media such as magnetic, optic, and semiconductor media (e.g. hard drives, optical disks, flash memory, DRAM), as well as communications links such as conductive cables and fiber optic links. According to some embodiments, the present invention provides, inter alia, computer systems and/or mobile communication devices programmed to perform the methods described herein, as well as computer-readable media encoding instructions to perform the methods described herein. It will be clear to one skilled in the art that the embodiments described herein may be altered in many ways without departing from the scope of the invention.

Some embodiments of the present invention provide a secure way to authenticate a user via a mobile communication device. Such authentication is useful e.g. for accessing web resources such as e-banking, electronic payment, and content subscription services, among others. In some embodiments, user authentication proceeds via a secure communication between an application running on a mobile communication device such as a mobile telephone and an identity authentication server. The server identifies itself against the mobile communication device via a certificate, while the mobile device proves its identity via a challenge-response exchange. In some embodiments, the challenge-response exchange requires a pair of cryptographic keys (one public, one private), as described below (see "Registration"). In some embodiments, a software private key stored on a mobile communication device may be used in conjunction with a corresponding public key stored on an authentication server to perform secure operations such as encryption and digital signing, among others. In particular, such a private key may be used to secure access to other keys or restricted resources stored on the mobile communication device, such as symmetric and/or asymmetric keys which may be used for encryption and digital signing.

FIG. 1 shows an identity authentication system 10 according to some embodiments of the present invention. Authentication system 10 comprises a set of client computer systems 20a-c, a service provider computer system 22, an authentication server computer system 60, and a set of mobile communication devices 30a-b, all connected to a wide area network (WAN) 14 such as the Internet. A local area network 12 and a telecom/LAN/WAN network 16 may also connect some components of authentication system 10 to WAN 14. In some embodiments, any two or more of the illustrated service provider system 22, authentication server system 60, and client computer systems 20a-c may be implemented on common hardware, e.g. a common physical computer server. For example, in an automatic teller machine (ATM) system, the ATM machine may include a service provider, client, and authentication server on a common physical computer system, and connected to each other through the memory or other local structures of the physical computer system. In some embodiments, each of the systems shown in FIG. 1 is implemented on a distinct physical computer system, and is connected to other systems through LAN/WAN/telecom network connections.

Figure 2:
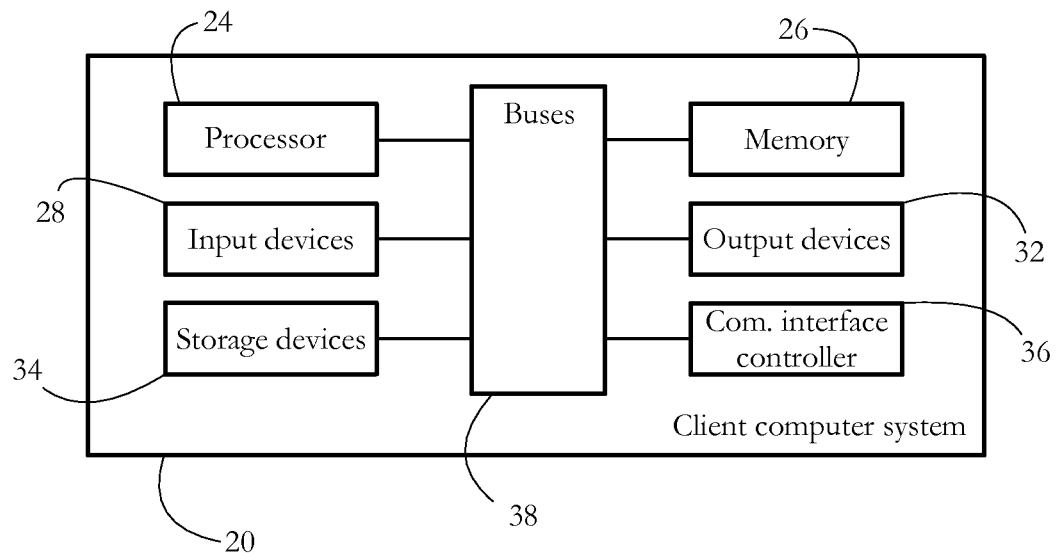
FIG. 2 illustrates exemplary hardware components for a client computer system according to some embodiments of the present invention.

A client computer system 20 comprises a plurality of hardware components, schematically illustrated in FIG. 2. In particular, one or more buses 38 connect a microprocessor (CPU) 24, memory (e.g. DRAM) 26, input devices (e.g. mouse, keyboard) 28, output devices (e.g. display, speakers, haptic/vibration generator) 32, storage devices (e.g. hard drive, solid state drive) 34, and a communication interface controller (e.g. network interface card) 36. The illustrated computer system 20 may be a personal computer, automatic teller machine (ATM), or mobile communication device usable to establish authenticated access to restricted resources. Such devices may be devices capable of web browsing and thus access to remotely-hosted protected websites, such as desktop, laptop, tablet computer devices, or mobile phones such as smartphones. In some embodiments, such devices may also be gateways to local resources, such as automatic teller machines (ATM), physical premise (e.g. building) security devices, or other local-authentication devices. If implemented on separate physical devices from client computer system 20, each of service provider computer system 22 and authentication server computer system 60 includes hardware components similar to the ones shown in FIG. 2.

Figure 3:
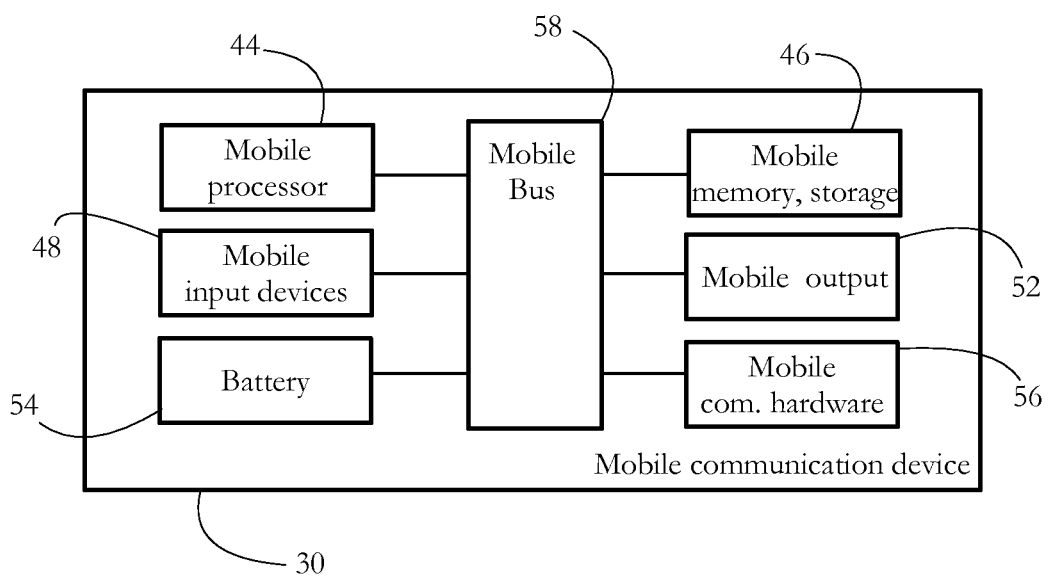
FIG. 3 shows exemplary hardware components for a mobile communication device according to some embodiments of the present invention.

A mobile communication device 30 includes a plurality of hardware components, schematically illustrated in FIG. 3. In particular, one or more buses 58 connect a mobile processor (CPU) 44, mobile memory and storage (e.g. DRAM, solid state drive) 46, mobile input devices (e.g. physical or touch-sensitive keyboard) 48, mobile output devices (e.g. display, speakers, haptic/vibration generator) 52, a battery 54, and mobile communication hardware (e.g. network interface card) 56. The illustrated mobile communication devices are portable devices with an autonomous power source (e.g. battery), such as mobile phones (e.g. smartphones), which are ordinarily carried by and uniquely associated with a user, and which are capable of performing the client-side authentication and/or display steps described below. Each mobile communication device may run an application (App) computer program configured to perform identity authentication, as shown below. In some embodiments, the same mobile communication device (e.g. a smartphone running a browser) may be used to perform the steps described below for mobile communication devices and client devices.

Authentication

Figure 4:
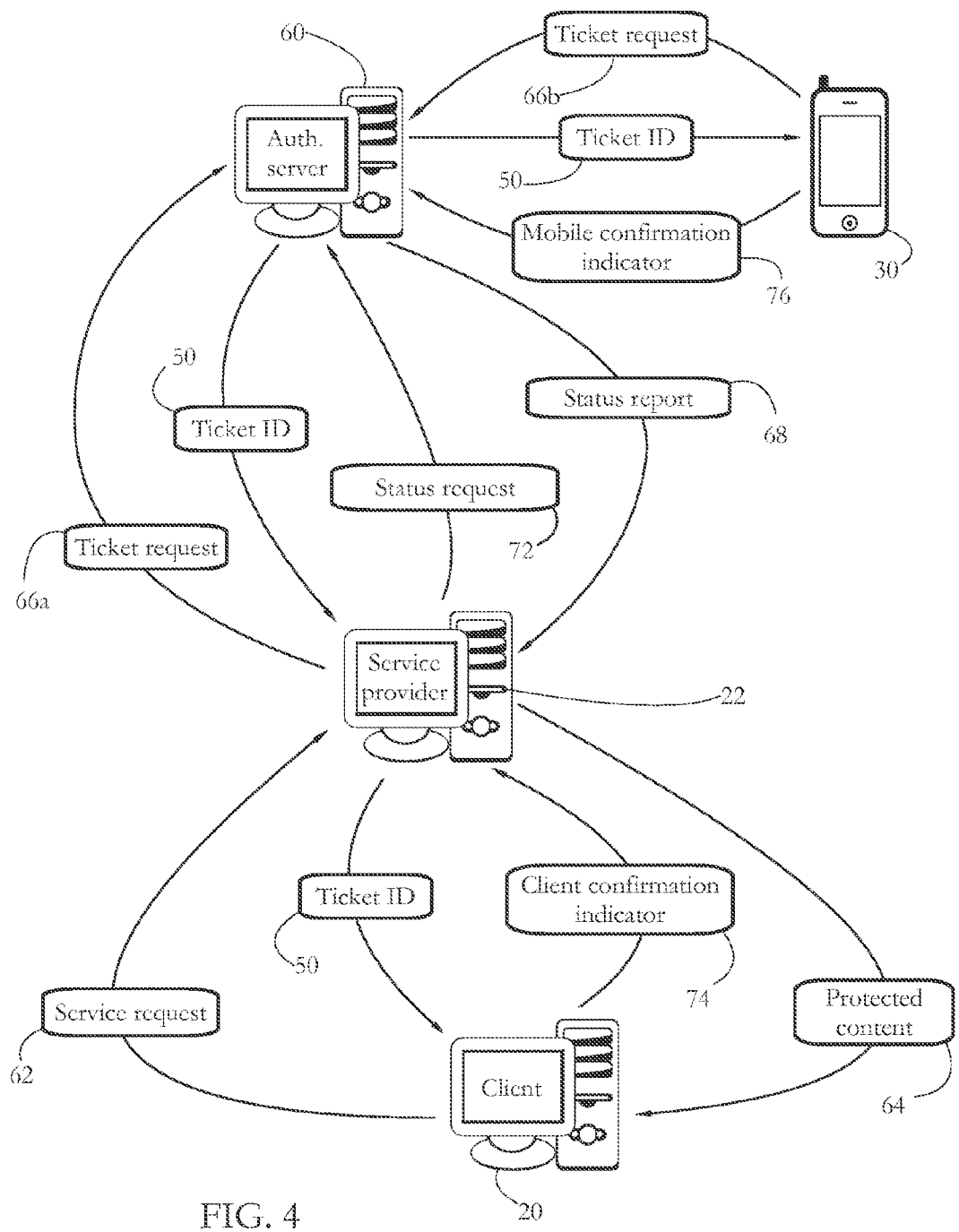
FIG. 4 illustrates a sequence of data exchanges between a client computer system, a service provider server, an authentication server, and a mobile communication device according to some embodiments of the present invention.

FIG. 4 illustrates a sequence of data exchanges between a client computer system 20, a service provider server 22, an authentication server 60, and a mobile communication device 30 to perform a user authentication according to some embodiments of the present invention. When a user requests access to a protected resource from a service provider (e.g. via a web portal), the service provider computer system launches a sequence of data exchanges with the client computer system and authentication server computer system. In some embodiments, all illustrated data exchanges are performed over secure connections. As described above, in some embodiments the client computer system may be the mobile communication device itself.

When a user desires to log into a protected resource (e.g. website) on service provider server 22, client computer system 20 sends to service provider server 22 a service (login) request 62 including an identifier of the user's account (e.g. the user's username). In response, service provider server 22 sends a ticket request 66a including an identifier of the user's account to authentication server 60. In some embodiments, mobile communication device 30 may also send a Ticket ID request 66b to authentication server 60. In response to one or both of requests 66a-b, authentication server 60 generates an authentication session identifier (Ticket ID) 50, and sends Ticket ID 50 to service provider server 22 and mobile communication device 30. Client computer system 20 and mobile communication device 30 present matching Ticket ID sensory representations (e.g. displays) to the user. The Ticket ID sensory representation presented by client computer system 20 may be generated by service provider server 22. In response to the presentation of a Ticket ID representation on mobile communication device 30, and confirmation by the user that the Ticket ID representations on mobile communication device 30 and client computer system 20 match, the user accepts or rejects the authentication session by entering appropriate input on communication device 30. In response, mobile communication device 30 sends a mobile confirmation indicator 76 to authentication server 60, indicating whether the authentication session has been accepted or rejected by the user. In some embodiments, client computer system 20 also sends a client confirmation indicator 74 to service provider 22. Service provider server 22 sends an authentication session (Ticket ID) status request 72 to authentication server 60, and receive a ticket state 68 (e.g. accepted, denied) in response. If the ticket is accepted, a secure session is established between client computer system 20 and service provider server 22, and protected content 64 is transferred from service provider server 22 to client computer system 20.

While it may be preferred to have authentication server 60 generate the Ticket ID for the login session, and send that common identifier to both mobile communication device 30 and service provider computer system 22, in some embodiments the Ticket ID may be generated by the mobile communication device, the service provider computer system, or possibly by another computer system, and propagated to the other computer systems to allow the presentation of matching Ticket ID representations by mobile communication device 30 and client computer system 20.

Figure 5:
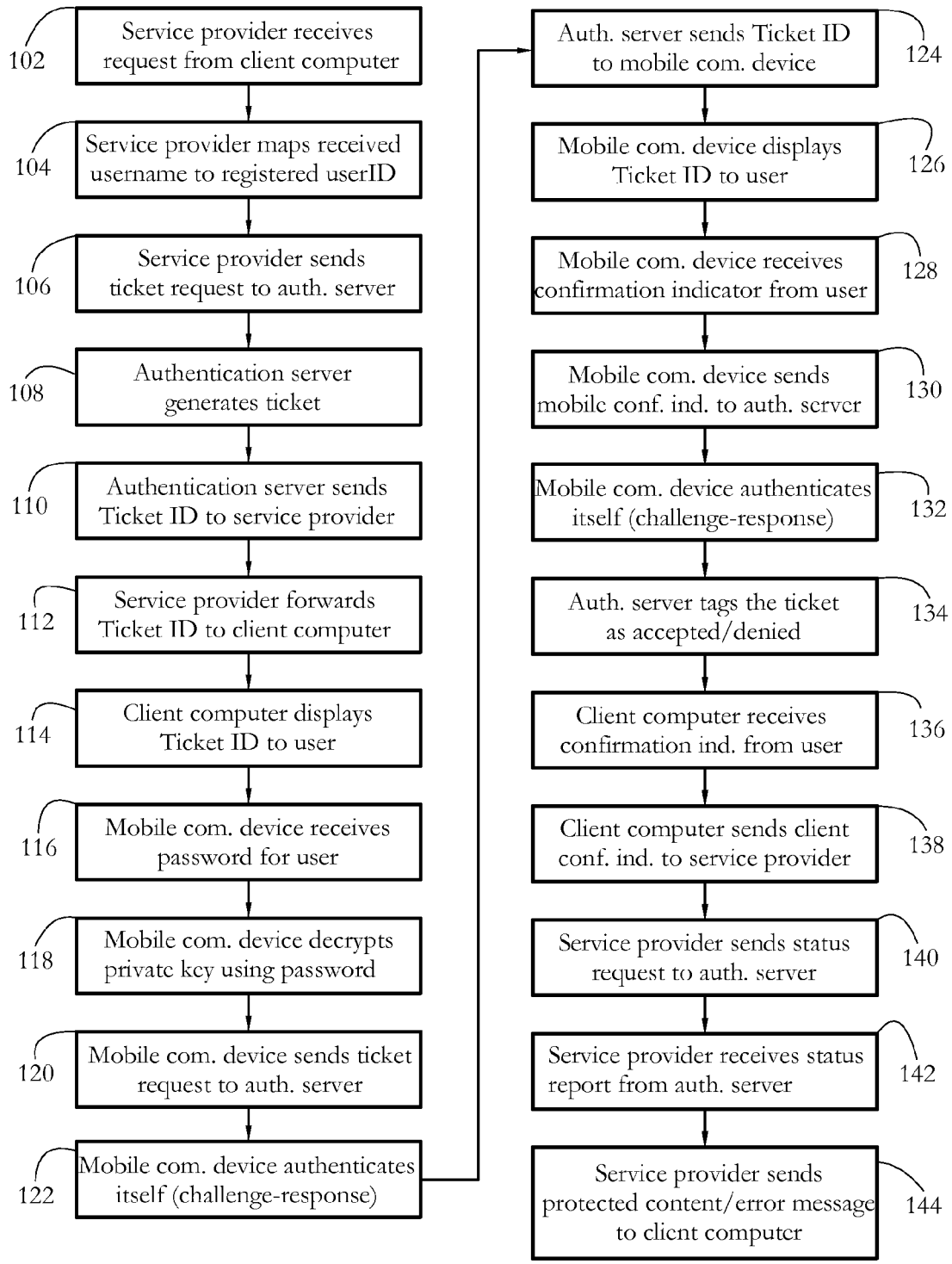
FIG. 5 shows a user authentication sequence of steps according to some embodiments of the present invention.

FIG. 5 shows a user authentication sequence of steps according to some embodiments of the present invention. It is understood that, as with features or steps illustrated in other Figures, one or more of the steps of FIG. 5 may be modified or omitted in some embodiments; for example, the mobile communication device need not necessarily authenticate itself multiple times to the authentication server as described in exemplary embodiments below. In a step 102, service provider server 22 receives a login (authentication) request including a username from client computer system 20 when the user enters his username to request access to the service provided by service provider server 22. In response, service provider server 22 maps the received username to an identifier of a registered identity/user (userID) (step 104), and requests authentication from authentication server 60 by sending to authentication server 60 an authentication ticket (Ticket ID) request including the mapped userID and a human-readable description of the service provided by service provider server 22 (e.g. BigBank Online Banking) (step 106). In response, authentication server 60 generates a Ticket ID suitable for identifying the login session. The generated Ticket ID includes an identifier of the login session, and may include or be associated with a timestamp of issue (e.g. date and/or time) for the Ticket ID. Authentication server 60 sends the Ticket ID and associated timestamp to service provider server 22 (step 110), which in turns forwards the Ticket ID and timestamp to client computer system 20 (step 112). In a step 114, client computer system 20 presents a sensory representation (e.g. display) of the Ticket ID to the user.

To complete the login process, the user accesses an authentication application running on mobile communication device 30. Mobile communication device 30 receives from the user a key-decryption password associated with the user's account/identity (step 116), and decrypts a locally-stored user private key using the received password (step 118). In a step 120, mobile communication device 30 requests any pending Ticket ID(s) for the user's identity from authentication server 60. In a step 122, mobile communication device 30 authenticates itself as the owner of the identity via challenge-response authentication using the decrypted private key, as described in more detail below in the section "Challenge-Response Exchange." In a step 124, authentication server 60 returns to mobile communication device the Ticket ID and associated timestamp and human-readable description of the service provided by service provider server 22.

Figure 8:
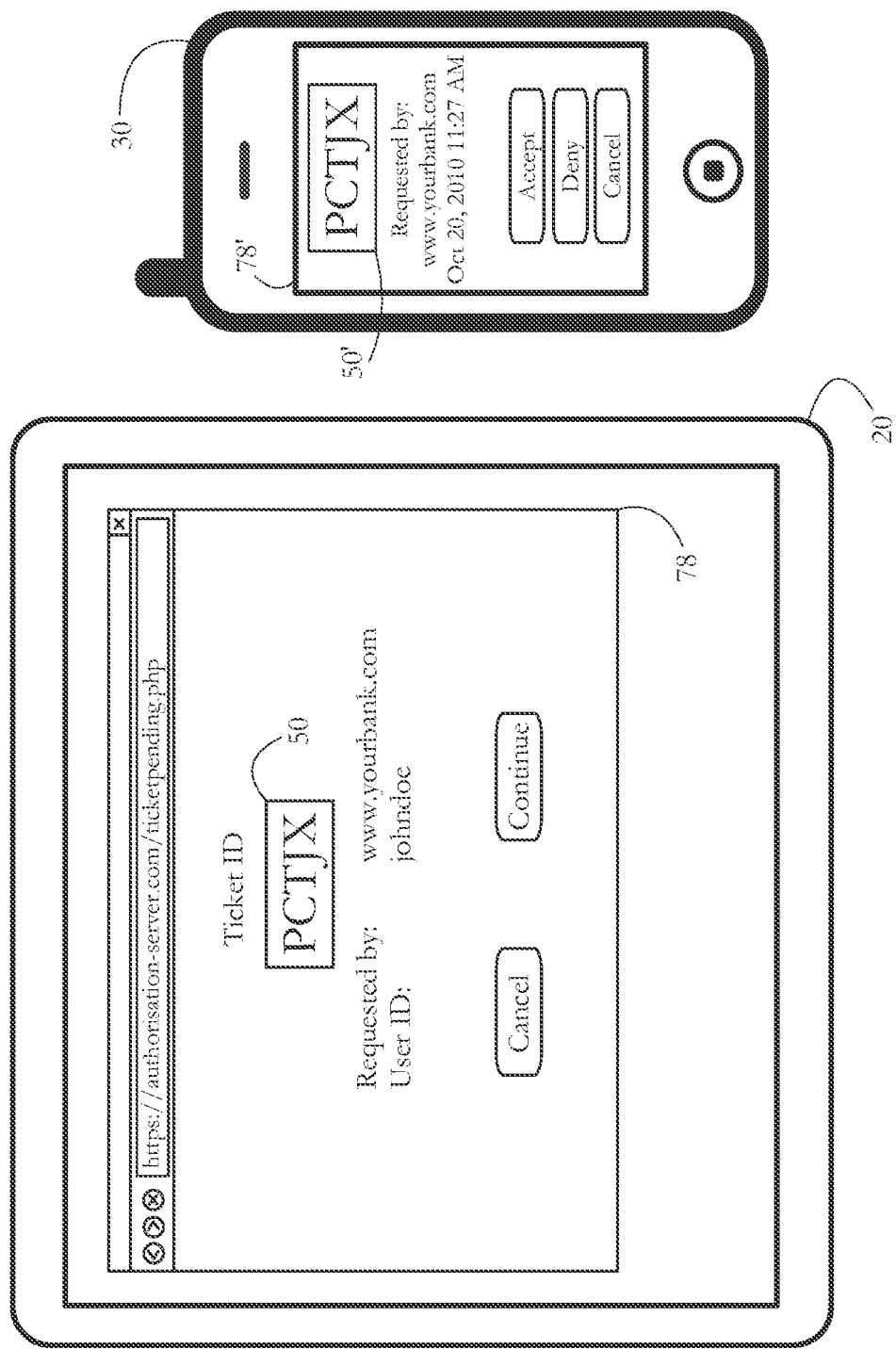
FIG. 8-A shows an exemplary display of matching Ticket IDs on a client computer system and a mobile communication device according to some embodiments of the present invention.

In a step 126, mobile communication device 30 presents a sensory representation (e.g. display) of the Ticket ID and associated timestamp and human-readable service to the user. The sensory representation presented by mobile communication device 30 matches the sensory representation presented by client computer system 20 in step 114. Exemplary matching Ticket ID representations are shown in FIGS. 8-A-B. The user verifies that the two sensory representations match, and that the timestamp and service description make sense, and decides whether to accept or deny the access to the authentication ticket requested on mobile communication device 30. Mobile communication device 30 receives a confirmation/acceptance or denial indicator input by the user (step 128), sends to authentication server 60 a request to accept the Ticket ID (step 130), and authenticates itself to authentication server 60 as the owner of the identity via challenge-response authentication using the private key (step 132). In a step 134, authentication server 60 tags the authentication ticket as accepted or denied.

In a step 136, client computer system 20 receives a confirmation indicator from the user, indicating that the user wishes proceed with the login operation. In a step 138, client computer system 20 asks service provider server 22 to continue by sending a confirmation indicator to service provider server 22. In a step 140, service provider server 22 asks authentication server 60 for the ticket state by sending a ticket status request. Authentication server 60 returns the ticket status (accepted/denied) to service provider server 22 (step 142). In a step 144, service provider server 22 grants access to client computer system 20 if the ticket is accepted, or displays an error message if not.

Figure 6:
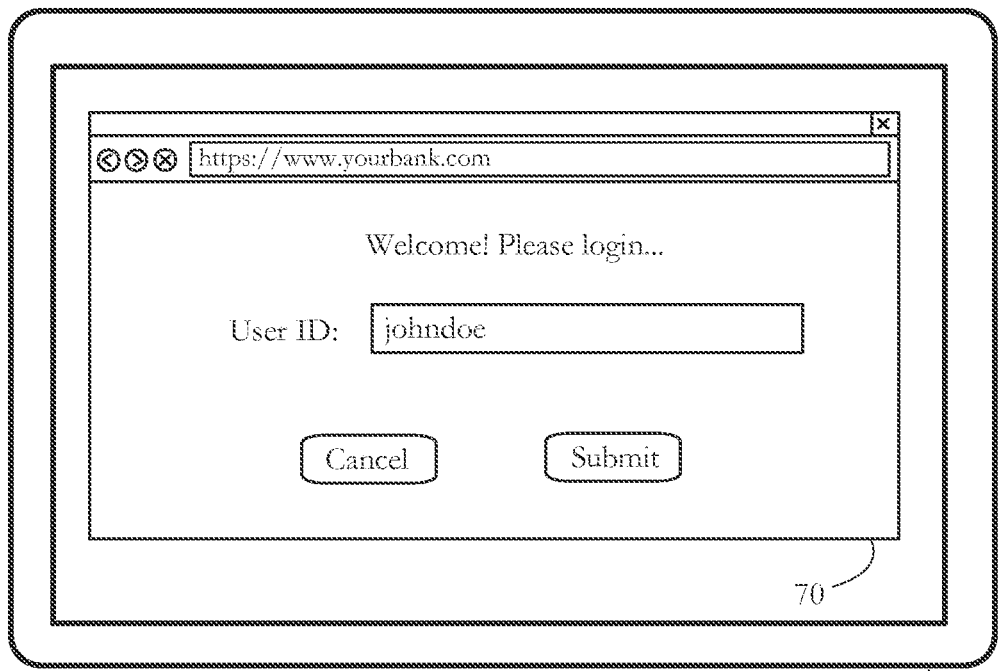
FIG. 6 shows a login screen generated by a service provider system and displayed on a client computer system, according to some embodiments of the present invention.

FIG. 6 shows an exemplary login screen 70 displayed on client computer system 20 for establishing an authenticated session with a web portal established by service provider server 22. Login screen 70 is a secure (e.g. Transport Layer Security/TLS or Secure Socket Layer/SSL) login screen of the web portal allowing a user to enter the unique name of his identity (username). Login screen 70 corresponds to a unique login/authentication session, which, as is known in the art, may include performing an authenticated handshake protocol between the service provider and the client computer. In some embodiments, the login screen need not include a password field, since the user's identity is verified through authentication server 60 and mobile communication device 30 as described above. In some embodiments, the login screen may include a password field, and the remote/backend authentication described above may be performed in conjunction with a conventional password-based authentication performed directly by service provider server 22.

Figure 7:
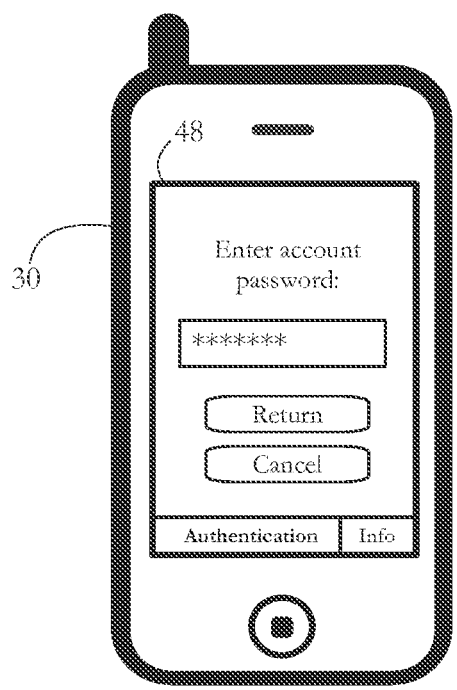
FIG. 7 shows a login screen displayed on a mobile communication device, according to some embodiments of the present invention.

FIG. 7 shows an exemplary login screen 48 displayed on mobile communication device 30 in order to allow access to the user's private key stored on mobile communication device 30. Login screen 48 includes a password entry field for receiving the password user input from the user. Login screen 48 is generated by an authentication App running on mobile communication device 30, which is used to obtain the pending ticket for the user's identity from authentication server 60. Mobile communication device 30 may communicate with authentication server 60 using a secure connection such as a connection using a TLS (Transport Layer Security) or SSL (Secure Sockets Layer) protocol, which may use a challenge-response mechanism for authentication. To prove that the user is the owner of the identity, mobile communication device 30 authenticates itself using the private key of the identity. To use the private key, the user enters his/her password into the mobile communication as shown in FIG. 7. The App decrypts the private key with the entered password. In some embodiments, the private key is securely stored on the mobile communication device in an unstructured form described below under "Registration."

FIG. 8-A shows a pair of matching Ticket ID representations 50, 50' displayed by client computer system 20 and mobile communication device 30 within Ticket ID display screens 78, 78', respectively. Display screens 78, 78' include a description of the service provider (e.g. domain name). Mobile device display screen 78' also includes a timestamp associated with the Ticket ID, as well as user input fields for accepting or rejecting the Ticket ID. The Ticket ID shown in FIG. 8-A comprises an alphanumeric set or ordered list (e.g. string, array, or integer) of characters and/or numbers, PCTJX in the illustrated example, the set being uniquely associated to the respective session-specific authentication request. The two representations may differ in formatting—e.g. font, size, display color, screen resolution, etc. More generally, the Ticket ID may include other identifiers suitable for identifying a login session. Such ticket IDs may be chosen to be long/specific enough to prevent the collision of identical ticket IDs generated for different login sessions. In some embodiments, such ticket IDs may be generated at the authentication server 60 e.g. by hashing or other methods, for example random generators which make a Ticket ID unpredictable for a potential attacker. Service provider 22 then presents a representation of the Ticket ID to the user on client computer system 20.

Authentication server 60 returns the pending ticket including the respective Ticket ID (or a different but matching Ticket ID) to the authentication App on the mobile communication device 30. In some embodiments, the Ticket IDs provided by authentication server 60 to service provider server 22 and mobile communication device 30 are identical. In some embodiments, the two ticket IDs are distinct, but form a matching pair that can be used by the service provider and mobile communication device to generate matching ticket ID sensory representations, as shown below in FIG. 8-C.

The user verifies that the Ticket ID representation 50' displayed by mobile communication device 30 matches the Ticket ID representation 50 displayed on client computer system 20. The user then accepts or denies the pending ticket using the user interface of mobile communication device 30. The user can accept the ticket if the two ticket ID representations match. If the two representations do not match, the user can avoid accepting a ticket that does not match the session he/she would like to authenticate. The representations may not match if for example someone other than the user has attempted a login, or if the user has made a second login attempt after a disconnection or other event interrupted a first login attempt. In some embodiments, the two representations match if they are identical in substance/content (i.e. are defined by identical alphanumeric sequences), as shown for example in FIG. 8-A. The two representations may differ in formatting—e.g. font, size, display color, screen resolution, etc.

In some embodiments, if the ticket has been accepted by the user on mobile communication device 30, authentication server 60 pushes an acceptance notification to service provider server 22, which in response authenticates the user's corresponding login session on the service provider server 22, and grants the user access to the desired protected service/resources. The access may be granted without requiring any user confirmation/input on the client computer system 20 for example by using appropriate Javascript code on the login website. In some embodiments, the user may be asked to confirm the completion of identity authentication on the web portal and/or to click to proceed with the login on client computer system 20 after authentication is completed. The communication of the acceptance notification may also be implemented using a pull model, by sending first a request from the service provider server 22, and receiving an acceptance notification in response from the authentication server 60.

In some embodiments, only one ticket can be pending for a given identity. If authentication by authentication server 60 is requested while a ticket is already pending for that identity, the existing ticket is retracted and no new ticket is issued, in order to make it more difficult for an attacker to replace a pending ticket with his/her own ticket.

In some embodiments, if a ticket is retracted due to multiple authentication requests, the identity (account) is marked as vulnerable by the authentication server system. An identity may also be marked as vulnerable if some predetermined number, which may be higher than one, of retractions or uncompleted authentication attempts are detected by the authentication server. If another authentication request is made for a vulnerable identity, the ticket ID will not be returned to mobile device 30. Instead, the user must enter the ticket ID manually as displayed by the App. Requiring manual entry addresses a situation in which a user accidentally accepts a ticket generated by an authentication request of an attacker (See also "Reliable Authentication" below).

FIG. 8-B shows an exemplary mobile device Ticket ID screen 78" including multiple similarly-formatted co-displayed representations of potential Ticket IDs, only one of which is a valid Ticket ID representation 50. The various representations may include the same number of characters/numbers in identical or similar fonts. A user chooses the correct Ticket ID from among the available choices. Forcing users to choose the correct Ticket ID from among multiple choices as shown in FIG. 8-B reduces the likelihood of users' inadvertent selection of non-matching Ticket IDs. Such inadvertent selections can become particularly pronounced as users get accustomed to the authentication process, and select Ticket ID representations semi-automatically, without reviewing carefully the match between the two members of the Ticket ID display pair.

In some embodiments, a Ticket ID representation may include other types of graphical and/or other sensory representations that can be recognized by a user as matching each other and identifying a login session. Exemplary graphical representations may include combinations of numbers, letter, other symbols, and/or pictures (e.g. colored surfaces/patterns). Matching may be established by similarity or complementarity of shapes, colors, hatching or other texture patterns, or other graphical features. Exemplary auditory representations may include speech, music, and/or sound/beep sequences. Exemplary tactile representations may include vibration sequences/patterns. In other examples, one representation may be a graphical representation of a word or alphanumeric sequence while the other is a spoken/auditory representation of the word/alphanumeric sequence, or one representation may be a Morse code sequence display while the other may be a matching vibration sequence played by the mobile communication device. In some embodiments, the two representations match if they are complementary, so that a user can recognize the two representations as forming a pair. In one example, one representation may be a picture that would be recognized as complementary to another—e.g. two geometric patterns having a mutually matching irregular boundary pattern, or geometric or other graphic patterns having complementary colors or shapes, or the cartoon characters Tom and Jerry, if users recognize Tom as a match for Jerry. Suitable Ticket ID representations may include pairs of representations, in whatever form, that a human user can verify/confirm as matching each other.

Challenge-Response Exchange

When accessing an identity on authentication server 60, mobile communication device 30 may be required to prove that it is the owner of the respective identity. This may be done via a challenge-response exchange or other methods known in the art. An exemplary set of steps performing challenge-response is illustrated in FIG. 9. In a step 150, mobile communication device 30 sends a request to authentication server 60 for a given identity. Authentication server 60 generates a random challenge and returns it to mobile communication device 30, requesting authentication (step 152). Mobile communication device 30 signs (encrypts) the challenge with the locally-stored private key associated with the identity (step 154), and sends a token including the signed challenge to authentication server 60 (step 156). In a step 158, authentication server 60 validates the signature using the public key for the given identity. In a step 160, authentication server 60 continues serving the request if the signature is validated, or returns an error if the validation fails.

Reliable Authentication

In some embodiments, if another ticket is requested while a ticket is already pending, authentication server 60 retracts the existing ticket, but issues no new ticket, since such an occurrence could be an indication of an attack. However, the user can now request a new ticket. In such a case of a possible attack, authentication server 60 tags an identity as vulnerable. In some embodiments, the user then does not get the Ticket ID displayed but must enter it manually on mobile communication device 30, after mobile communication device displays the timestamp of issue and a description (e.g. name) of the service to the user, and the user verifies that the timestamp and service description make sense. The user manually copies the Ticket ID characters from the display of client computer system 30 to the mobile communication device 30, and decides whether to accept or deny the requested access to the ticket. Requiring such manual entry reduces the chance that a user accidentally accepts a different ticket than that displayed by the service provider and/or authentication App.

Registration

In some embodiments, before any identity authentication can proceed, mobile communication device 30 registers itself at authentication server 60. Mobile communication device 30 creates a cryptographic key pair, shown in FIG. 10 at 80*a-b*, and transmits a public key 80*a* to authentication server 60, while storing a corresponding private key 80*b* locally on mobile communication device 30. As specified above, the term "public key" is used herein because of its common usage referring to one part of an asymmetric key pair; the described public key need not be, and preferably is not, made available to the public, and is stored securely and confidentially on authentication server 60. The public key is immediately deleted completely from the mobile communication device, in order to prevent verification by an attacker of a successful decryption of the private key in case of a brute force attack, as described below. Some embodiments may employ a 1024-bit RSA (Rivest, Shamir and Adleman) key pair. The length of the keys can be increased at any time, to increase security. In some embodiments, private key 80*b*, which is stored on mobile communication device 30, is 256-bit AES (Advanced Encryption Standard) encrypted using a user-defined password. Such encryption avoids illegitimate use of an identity by third parties. The user has to enter the password to decrypt private key 80*b* before it can be used, as shown in FIG. 7. Since only the respective user knows the correct password and since the password is not stored on the mobile communication device, the private key cannot be readily compromised. In some embodiments, mobile communication device 30 only transmits public key 80*a*, which can be used to verify the identity of the respective user. Only private key 80*b* can be used to prove the identity corresponding to public key 80*a*.

Since private key 80*b* is never transmitted anywhere, it cannot be intercepted or compromised on the server side.

Figure 12:
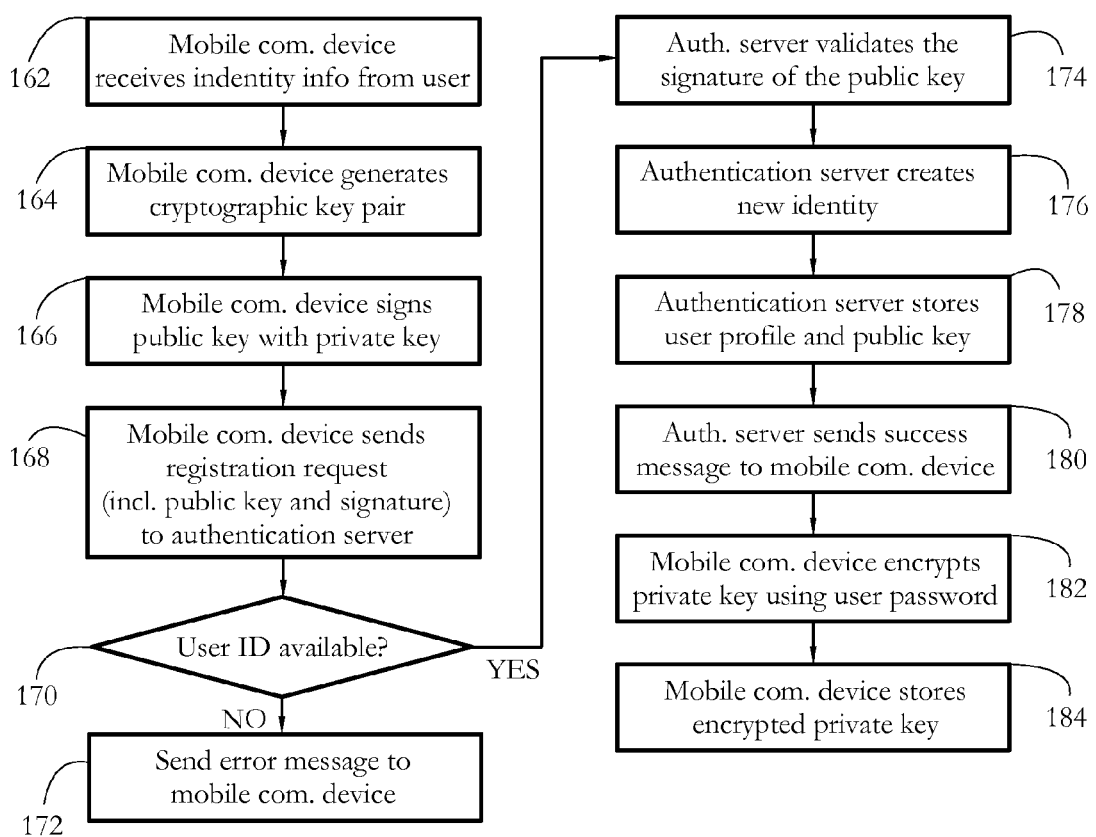
FIG. 12 shows a sequence of steps performed in a registration procedure according to some embodiments of the present invention.

An exemplary sequence of steps carrying out a registration procedure is illustrated in FIG. 12. In a step 162, mobile communication device 30 receives identity and other setup information from a user. Such information may include a human-readable name for personal use, a user ID, password, and host address and port. Other such information may include a title and email address. Mobile communication device 30 generates a cryptographic key pair including a private key and a public key (step 164), and signs the public key with the private key (step 166). In a step 168, mobile communication device 30 sends a registration request to authentication server 60. The registration request may include a desired user ID, the public key, the signed public key, and the associated personal data entered by the user. Authentication server 60 checks whether the requested user ID is available (step 170), and returns an error message to mobile communication device 30 if the user ID is not available (step 172). If the user ID is available, authentication server 60 validates the signature of the public key, verifying that the sender of the registration request owns the corresponding private key (step 174). Authentication server 60 creates a new identity for the selected user ID (step 176), stores the public key and user profile associated with the user ID (step 178), and sends a success message to mobile communication device 30 (step 180). In a step 182, mobile communication device 30 encrypts the private key using the user password. Mobile communication device 30 then stores the encrypted private key and user profile (step 184).

In some embodiments, only public key 80*a* is transmitted to authentication server 60. Public key 80*a* can then be used by authentication server 60 to verify the identity of the respective user. If private key 80*b* is never transmitted outside mobile communication device 30, it can't be intercepted or compromised on the server side. In some embodiments, the private key 80*b* stored on mobile communication device 30 is 256-bit AES (Advanced Encryption Standard) encrypted using a user-defined password, to reduce the chances of illegitimate use of an identity by third parties. The user has to enter the password to decrypt the private key before it can be used (e.g. FIG. 7). Since only the respective user knows the correct password and since the password is not stored on the mobile communication device, the confidentiality of private key 80*b* cannot be readily compromised.

In principle, the security of private key 80*b* relies on the quality of the user's password. Strong passwords are long and complicated and therefore hard to remember, so some users have the tendency to use simple passwords, which may be easy to guess by an attacker. Some mobile communication devices and/or do not readily allow users to use strong passwords. Even strong passwords may be vulnerable to brute-force attacks given sufficient computing power. To counteract attacks on the password, some embodiments of the present invention store private key 80*b* in an unstructured form, i.e. a form for which decryption of the private key with the correct password does not appear on the surface (e.g. syntactically) different from decryption with an incorrect password. Thus, an attacker may know readily determine whether a particular decrypted private key is a correct or incorrect private key.

In one approach commonly used in PKI cryptography, the syntax of private keys conforms to industry standards such as Public Key Cryptography Standard (PKCS) #8 (see IETF, RFC 5958. In such an approach, a private key may be structured as a data sequence comprising, among others, an indicator of the key version, an indicator of the cryptographic algorithm used, the cryptographic parameters of the key (e.g. modulus and private exponent), as well as a set of attributes, which may include e.g. the length of the key, the name of the owner, and the date of creation of the respective key. An exemplary PKCS #8 private key structure is shown in FIG. 11-B. Upon encryption, the syntax of the key is obscured along with the key's data, but can be discerned upon successful decryption of the private key. If such an approach to key storage is used, a legible syntax is an indicator of a successful decryption of the respective key.

In some embodiments of the present invention, the private key is stored on the mobile communication device in an unstructured form. An exemplary unstructured private key and a corresponding public (server-side) key are illustrated in FIG. 11-A. The unstructured private key comprises a concatenation of a fixed-length modulus N, shown at 92, and a variable-length private exponent d, shown at 94. The corresponding public key includes modulus N, shown at 92', and a public exponent e, shown at 94'. The modulus N is the product of two prime factors, P and Q, which are not included in/with the private key. For a 1024-bit RSA key, the modulus N has a length of 1024 bits. Other bit lengths may be used in other embodiments. The length of the private exponent d may be determined by subtracting the fixed length of the modulus N from the total length of the key data. The unstructured private key 80*b* is encrypted with the user's password. When an attacker attempts to decrypt private key 80*b* by brute force or other means, the result is always an unstructured sequence of numbers and/or characters, with no indicator of a successful decryption.

In some embodiments, the public (server-side) exponent e is chosen to be sufficiently long so as to be independently secure if considered as a symmetric key. For example, for current encryption technology, a public exponent having at least 128 bits, e.g. 256 or 512 bits, may be deemed sufficiently secure. Choosing such a relatively-long public key exponent renders impractical offline brute-force attempts by an attacker to verify decrypted private key candidates. In common RSA implementations, the public key is publicly available, and thus maintaining the confidentiality of the public exponent is not normally a concern for system designers. In such systems, the public key exponent may be 16-bit long or shorter. Such a short exponent would allow an attacker in possession of a private key candidate to verify whether the private key is correct simply by checking all possible 16-bit combinations for the corresponding public key, and identifying the private key as likely correct if a corresponding (matching) public key is found for that private key.

Since the unstructured private key has no formatting or obvious syntax, an attacker with limited or no access to the authentication server cannot readily recover cryptographic parameters N and d from the number/string obtained as a result of a decryption attempt, even if the attacker correctly guesses the password (as one among many) as a result of a brute force or other attack. To verify whether the private key was correctly decrypted, an attacker would need to communicate with authentication server 60, e.g. by engaging in a challenge-response exchange with authentication server 60, which involves sending a token encrypted with the candidate private key to authentication server 60, as described above. Security measures on the authentication server (e.g. limiting the number of unsuccessful authentication attempts, marking an identity as vulnerable and requiring independent verification after a given number of consecutive unsuccessful attempts, and so on) can limit the system's vulnerability to attacks if a user's mobile communication device is lost or otherwise compromised.

The added security provided by using an unstructured private key ("safe key") in conjunction with authentication using a server-side remote key may impose additional requirements/constraints on the system. The owner of a structured PKCS#8 private key such as the one illustrated in FIG. 11-A has all the information needed to perform asymmetric encryption between himself and any desired and multiple partners at any time. The PKCS#8 private key may also contain public information, which may be convenient for the user (unfortunately, also for an attacker).

In the more secure approach described above, the public key is transmitted to the authentication server and completely deleted from the mobile communication device immediately after the key pair is generated. Key length and version information are not encrypted with the private key; in some embodiments some or all of such information may be made unchangeable (fixed), held on the authentication server or somewhere else other than the mobile communication device, be discarded/ignored, or any combination thereof. As a result, after the initialization process is complete, the private key owner (and also an attacker) can no longer choose additional partners for encrypted exchange, or verify the correctness of the private key without involving the remote host of the public key. The private key may not be used as a source to recover the public key data in case the public key is lost on the remote side. Also, while structured PKCS #8 keys may be used for both synchronous communication with servers (e.g. using SSL/TLS encryption), and asynchronous communication with individual recipients (e.g. using email), the unstructured-private-key, remote-public-key approach described above relies on the availability of a remote server to confirm the correct use of the private key.

Identity Editing

In some embodiments, the user can edit at any time the identity information stored on mobile communication device 30 (e.g. user name, server address and -port), as well as the identity information stored on authentication server 60 (e.g. contact details, account preferences), and the password corresponding to the respective identity. All changes are carried out only after the user authenticates himself/herself by entering the password. When the user requests a change of password, the private key is decrypted with the old password and encrypted again with the new password.

Figure 13:
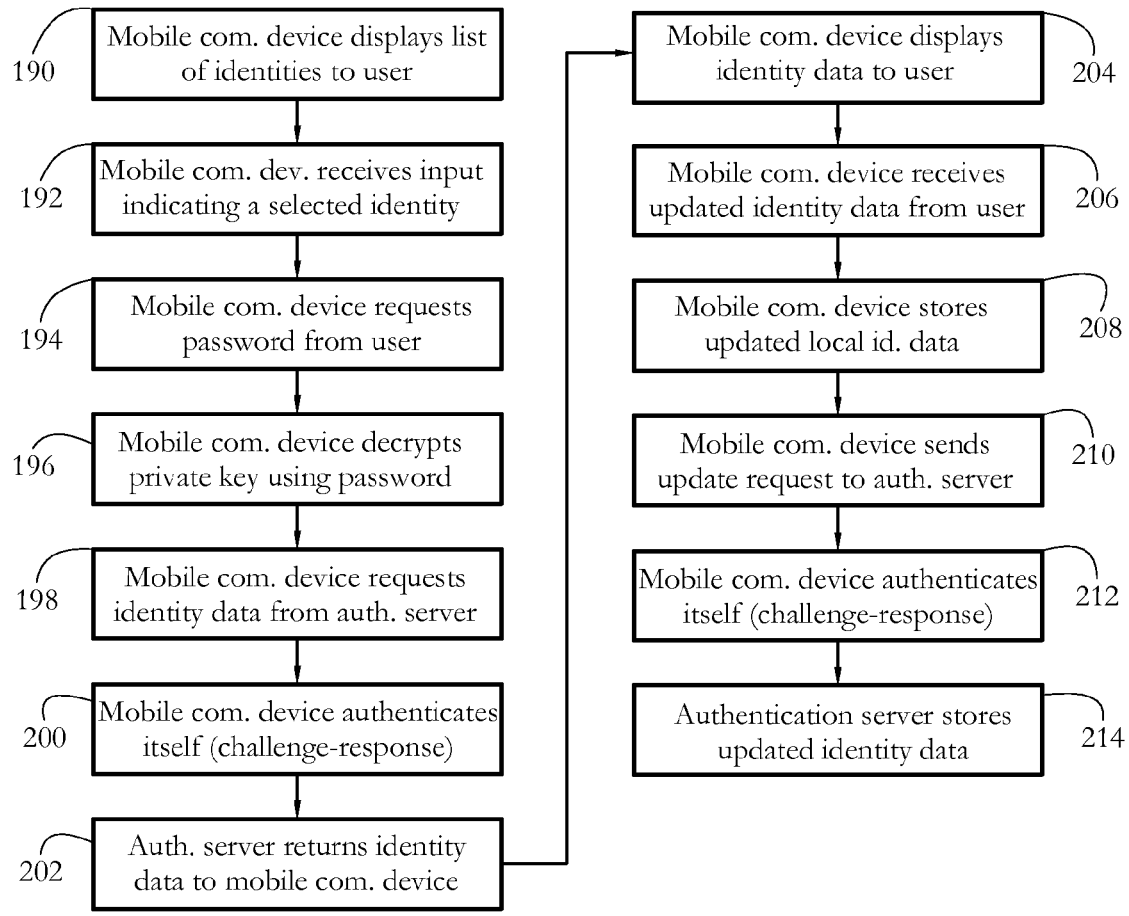
FIG. 13 shows a sequence of steps performed to edit an identity according to some embodiments of the present invention.

An exemplary sequence of steps for editing an identity is shown in FIG. 13. In a step 190, mobile communication device 30 displays a list of identities to the user. In a step 192, mobile communication device 30 receives user input indicating a selected identity. For example, the user may switch the identity list to edit mode, and tap a selected identity to edit. In a step 194, mobile communication device 30 asks the user for the password for the selected identity. In response to the user's entry of the correct password, mobile communication device 30 decrypts the private key for the selected identity using the entered password (step 196). In a step 198, mobile communication device 30 requests the personal information associated with the selected identity from authentication server 60. In a step 200, mobile communication device 30 authenticates itself to authentication server 60 using challenge-response authentication using the decrypted private key, as described above. In a step 202, authentication server 60 returns the requested personal information of the identity to mobile communication device 30.

In a step 204, mobile communication device 30 displays the personal information to the user for editing. Mobile communication device 30 receives updated personal information from the user (step 206), and saves the local information to local storage (e.g. disk) (step 208). Mobile communication device 30 then sends an update request asking authentication server 60 to save the personal information (step 210), and authenticates itself to authentication server 60 via challenge-response authentication (step 212). In response, authentication server 60 stores the updated personal information for the identity (step 214). Mobile communication device 30 then switches its display back to the identity list.

Key Renewal

It is possible to create a new key pair and to transmit the new public key to authentication server 60, to replace the old public key. In some embodiments, the key renewal option is available from within the authentication application running on mobile communication device 30, so the password for the old keypair has already been entered and the old key has already been decrypted.

Figure 14:
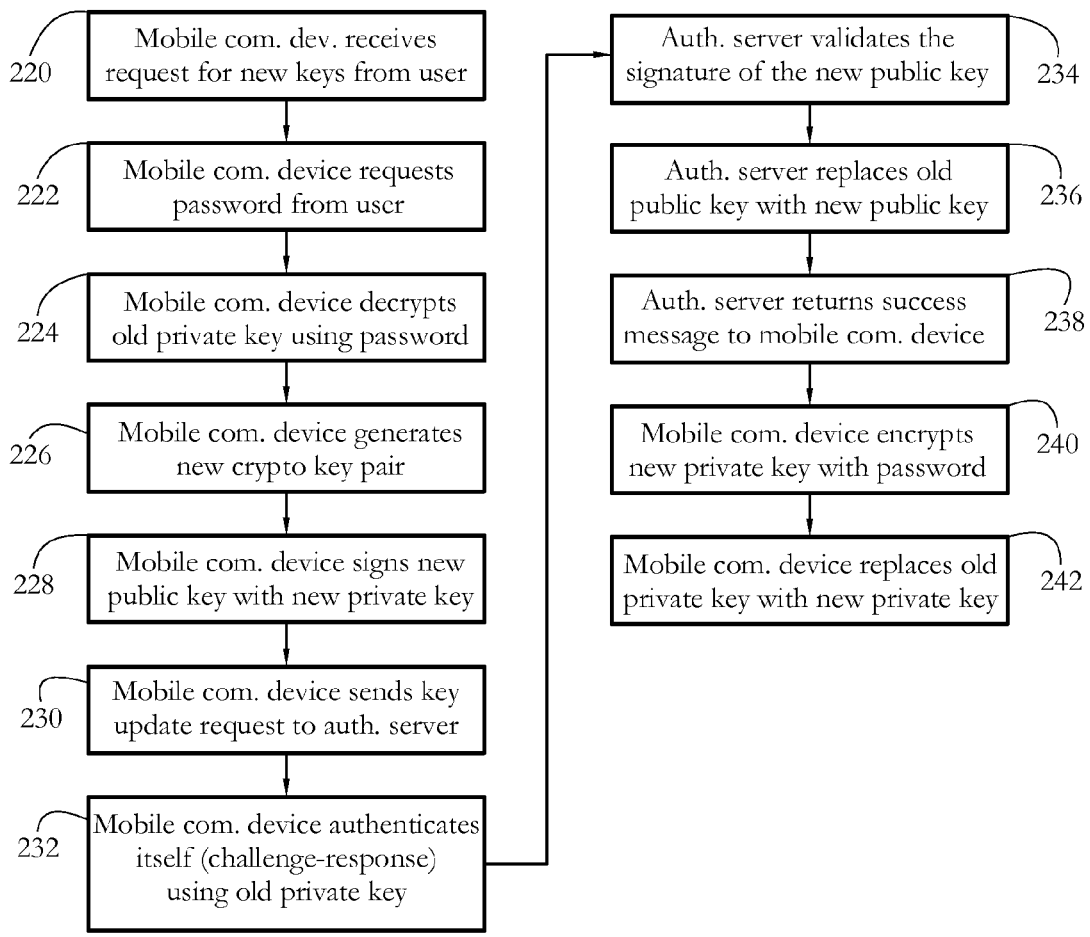
FIG. 14 shows a sequence of steps performed to renew a key pair according to some embodiments of the present invention.

An exemplary sequence of steps for renewing a keypair is illustrated in FIG. 14. In a step 220, mobile communication device 30 receives a request for new keys from a user. Mobile communication device 30 requests the password for the selected identity from the user (step 222), decrypts the existing (old) private key using the entered password (step 224), generates a new cryptographic key pair (step 226), signs the new public key with the new private key (step 228), and sends a key update request to authentication server 60 (step 230). The key update request may include the user ID, new public key, and the signed new public key. In a step 232, mobile communication device 30 authenticates itself via challenge-response authentication using the existing (old) private key. In response, authentication server 60 validates the signature of the new public key, verifying that the sender of the request owns the corresponding private key (step 234), replaces the existing (old) public key with the new public key in its records (step 236), and returns a success code to mobile communication device 30. Mobile communication device 30 encrypts the new private key with the corresponding password (step 240), and replaces the existing (old) private key with the new private key in its local storage (step 242).

Password Editing

Figure 15:
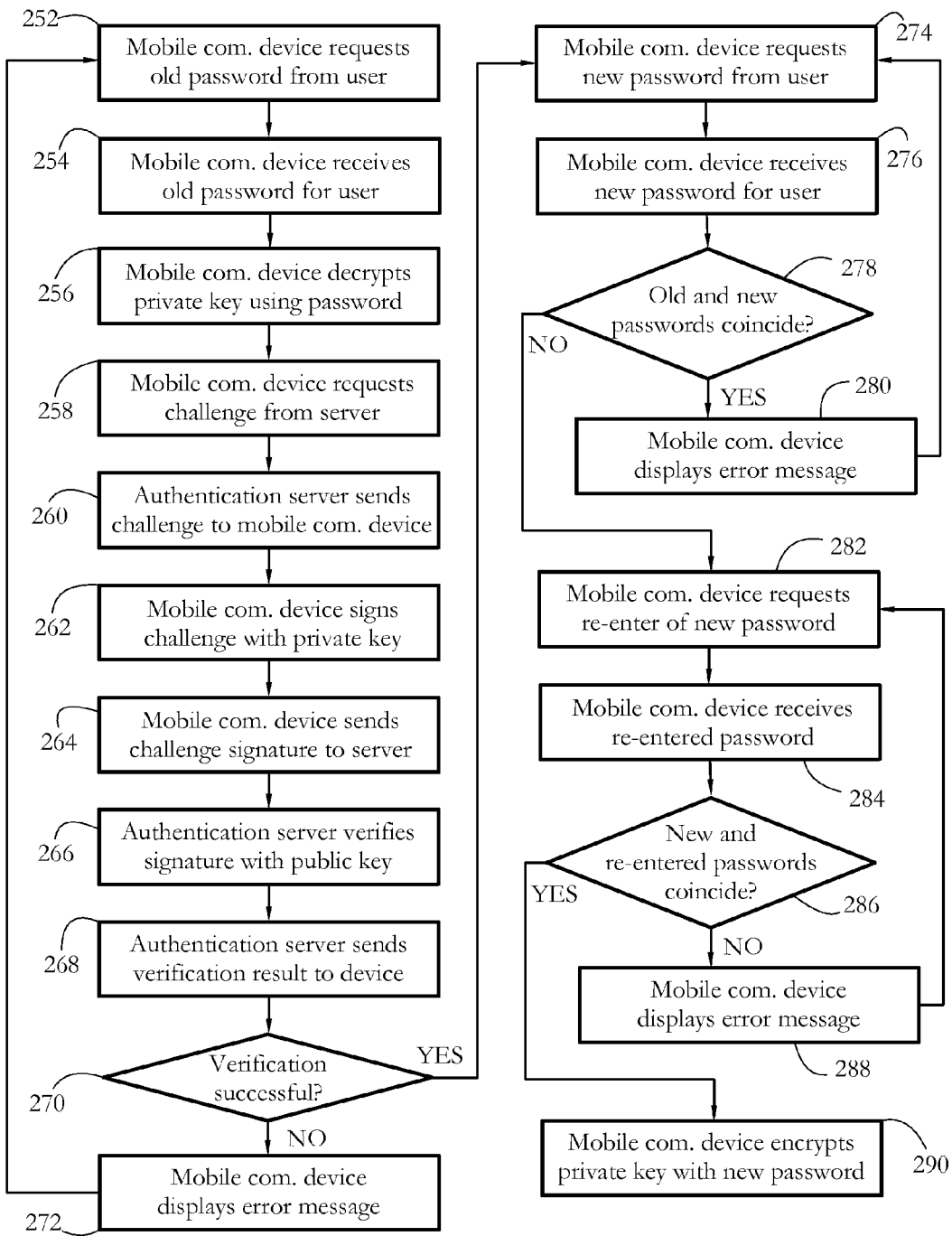
FIG. 15 shows an exemplary sequence of steps for changing the password used to secure a software private key stored on a mobile communication device, according to some embodiments of the present invention.

At any time, a user may change the password used to encrypt the private key 80b on the mobile communication device 30. An exemplary sequence of steps for changing the password is shown in FIG. 15. As described below, the password change process includes a verification, performed in conjunction with authentication server 60, that the present password is correct. Such a verification is one that mobile communication device 30 cannot perform on its own. If mobile communication device 30 were somehow able to verify locally that the entered password is or is not correct, that local verification process would also provide a vulnerability to local attack by an attacker in possession of mobile communication device 30. As shown in FIG. 15, in response to receiving a user input requesting a change in password, mobile communication device 30 requests the current (old) password from the user (step 252), and receives the current password from the user (step 254). In a step 256, mobile communication device 30 decrypts private key 80b using the received password. Step 256 occurs whether or not the received password is the correct one; if the user has entered an incorrect password, an incorrect decrypted private key will be generated upon decryption. As described above, mobile communication device 30 needs access to authentication server 60 to determine whether the decrypted key is correct.

In a step 258, mobile communication device 30 initiates a password-update communication sequence with authentication server 60 by requesting an authentication challenge from authentication server 60. In response, authentication server 60 sends an authentication challenge to mobile communication device 30 (step 260). Mobile communication device 30 signs (encrypts) the challenge using private key 80b (step 262) and sends a token including the encrypted challenge signature to authentication server 60 (step 264). In a step 266, authentication server 60 verifies the challenge signature using its stored public key 80a corresponding to the user identity identified by mobile communication device 30, i.e. the public key 80a corresponding to the correct private key 80b, and the verification result is sent to mobile communication device 30 (step 268).

In a step 270, mobile communication device 30 determines whether the verification performed by authentication server 60 was successful. If the verification was not successful, for example if the user entered an incorrect current password on mobile communication device 30 and thus the decrypted private key was incorrect, mobile communication device 30 displays an error message to the user (step 272). Mobile communication device 30 requests a new password from the user (step 274), and receives the new password from the user 276. In a step 278, mobile communication device 30 determines whether the password received at step 276 coincides with the existing password received at step 254. If the two password coincide, mobile communication device 30 displays an error message to the user (step 280), and requests a new password again (step 274). If the two passwords do not coincide, mobile communication device 30 asks that the user re-enter the new password (step 282), and receives the re-entered password (step 284). In a step 286, mobile communication device 30 determines whether the new and re-entered passwords coincide. If not, mobile communication device 30 displays an error message to the user and returns to step(s) 282 and/or 274 (step 288). If the two passwords coincide, mobile communication device 30 encrypts private key 80 with the new password (step 290).

CONCLUSION

The exemplary systems and methods described above provide ways of addressing inherent tradeoffs between authentication system usability and security. Once a user has established his identity and authenticated his mobile communication device, logins on service provider systems may be performed with minimal user input, e.g. without requiring entering a password on the service provider sites. In such a system, the security of the mobile communication device and of the encrypted private key stored on the mobile device gain additional importance. If an attacker were to identify the private key in decrypted form, such an attacker would gain access to multiple sensitive resources, including such resources as symmetric or asymmetric private keys used for encryption and/or digital signing.

While hardware-embedded smart card keys are difficult to tamper with, password-encrypted components of RSA keys stored on mobile communication devices can be copied and decrypted on high-performance computers of an attacker, particularly if the user password used for encrypting the private key is not secure enough. Secure passwords are long and include special characters, and as a result are difficult to remember. Attempts to require secure passwords often encounter user resistance, particularly in consumer applications. On the other hand, weaker passwords make decrypting a software private key computationally feasible. For a structured private key having a syntax such as that defined by the PKCS #8 standard, a successful attempt to decrypt the private key is readily distinguishable from unsuccessful attempts because the successful attempt will display a recognizable PKCS #8 syntax, while unsuccessful attempts will be unstructured.

Exemplary systems and methods described above allow reducing system vulnerability to attacks (e.g. brute force, dictionary, personal data attacks) on the user's password and associated private key. The private key for a given user identity is stored in encrypted and unstructured form on the mobile communication device, and the mobile communication device cannot determine locally whether a decrypted private key generated by decryption with a given password is in fact the correct private key for a given user identify. The public key corresponding to the identity is available only on the authentication server, and is not stored locally. In the absence of syntax for the private key, the attacker has no obvious indicator of a successful decryption of the private key. To test the validity of the decrypted key, an attacker would need confirmation of success from the authentication server, which allows adding an extra layer of security. The server may identify authentication requests that use incorrect private keys as possible attacks and may take countermeasures in response, for example by marking the corresponding identity as vulnerable, limiting the number of consecutive unsuccessful confirmation attempts, and/or alerting the legitimate owner of the respective identity.

It will be clear to one skilled in the art that the above embodiments may be altered in many ways without departing from the scope of the invention.

What is claimed is:

1. A mobile communication device comprising at least one processor and memory, wherein the mobile communication device:
    performs an authentication initialization sequence comprising:
        generating an asymmetric public key cryptography key pair comprising a private key and a corresponding public key,
        transmitting the public key to an authentication server system for storage,
        in response to transmitting the public key to the authentication server system, removing all copies of the public key from the mobile communication device, to prevent an attacker who has gained unauthorized access to the mobile communication device from gaining access to the public key, and
        storing on the mobile communication device the private key in encrypted form, the private key comprising a modulus N and a private exponent d;
    receives from the authentication server system a login session authentication confirmation request generated in response to a user request to log into a service provider;
    receives a user input indicating a user authorization of the user request to log into the service provider;
    decrypts the private key using a user-entered password;
    sends to the authentication server a token encrypted using the decrypted private key;
    receives from the authentication server a confirmation that the user-entered password is correct, the confirmation that the user-entered password is correct being indicative of a confirmation by the authentication server that the public key stored by the authentication server corresponds to the decrypted private key; and
    employs the decrypted private key to securely send to the authentication server system an indicator of the user's acceptance of the login session authentication confirmation request.

2. The mobile communication device of claim 1, wherein the mobile communication device:
   receives from the authentication server system a challenge; and
   generates the token by encrypting the challenge using the decrypted private key.

3. The mobile communication device of claim 1, wherein the public key comprises the modulus N and a public exponent, wherein the public exponent comprises at least 128 bits.

4. An authentication server computer system comprising at least one processor and memory, wherein the authentication server computer system:
   communicates with a mobile communication device of a user to authenticate the mobile communication device as authorized to validate a user login session by a user client computer system on a service provider server, wherein authenticating the mobile communication device comprises:
      sending to the mobile communication device a challenge;
      receiving from the mobile communication device a token generated by encrypting the challenge using a decrypted private key, the decrypted private key being generated by decrypting using a user-entered password a private key stored on the mobile communication device in encrypted form, the private key and a public key forming an asymmetric public key cryptography key pair, and
      confirming that the user-entered password is correct by verifying that the public key corresponds to the decrypted private key;
   sends to the mobile communication device a request for user validation of the user login session on the service provider server;
   in response to sending to the mobile communication device the request for user validation of the user login session, receives from the mobile communication device a user acceptance of the request for user validation of the user login session; and
   in response to authenticating the mobile communication device and receiving the user acceptance, sends to the service provider server an indicator of the user's acceptance, for allowing the user client computer system access to a restricted resource on the service provider server.

5. The authentication server computer system of claim 4, wherein the authentication server computer system sends to the mobile communication device a confirmation that the user-entered password is correct in response to verifying that the public key corresponds to the decrypted private key.

6. The authentication server computer system of claim 4, wherein the public key comprises a modulus N and a public exponent, wherein the public exponent comprises at least 128 bits.

7. A method comprising employing a mobile communication device comprising at least one processor and memory to:
   generate an asymmetric public key cryptography key pair including a private key and a public key, the private key including a modulus and a private exponent, the public key including the modulus and a public exponent;
   store the private key in encrypted form on the mobile communication device;
   transmit the public key for storage on an authentication server connected to the mobile communication device over a wide area network;
   receive a user-entered password to decrypt the encrypted private key, and in response verify that the user-entered password is correct by:
      sending to the authentication server a token encrypted using a decrypted private key, the decrypted private key being generated by decrypting the encrypted private key using the user-entered password, and
      receiving from the authentication server a confirmation that the user-entered password is correct, the confirmation that the user-entered password is correct being indicative of a confirmation by the authentication server that the public key stored by the authentication server corresponds to the decrypted private key;
   receive from the authentication server system a login session authentication confirmation request generated in response to a request to log a user client computer system into a service provider server;
   receive a user input indicating a user authorization of the request to log the user client computer system into the service provider; and
   employ the decrypted private key to securely send to the authentication server system an indicator of the user's acceptance of the login session authentication confirmation request.

8. The method of claim 7, further comprising employing the mobile communication device to receive from the authentication server a challenge, and in response encrypt the challenge using the decrypted private key to generate the token.

9. The method of claim 7, wherein the public exponent comprises at least 128 bits.

10. A mobile communication device comprising at least one processor and memory, wherein the mobile communication device:
   generates an asymmetric public key cryptography key pair including a private key and a public key, the private key including a modulus and a private exponent, the public key including the modulus and a public exponent;
   stores the private key in encrypted form on the mobile communication device;
   transmits the public key for storage on an authentication server connected to the mobile communication device over a wide area network;
   receives from a user a user password to decrypt the encrypted private key, and in response verify that the received user password is correct by:
      sending to the authentication server a token encrypted using a decrypted private key, the decrypted private key being generated by decrypting the encrypted private key using the received user password, and
      receiving from the authentication server a confirmation that the received user password is correct, the confirmation that the entered user password is correct being indicative of a confirmation by the authentication server that the public key stored by the authentication server corresponds to the decrypted private key;
   receives from the authentication server system a login session authentication confirmation request generated in response to a request to log a user client computer system into a service provider server;
   receives a user input indicating a user authorization of the request to log the user client computer system into the service provider; and
   employs the decrypted private key to securely send to the authentication server system an indicator of the user's acceptance of the login session authentication confirmation request.

11. The mobile communication device of claim 10, wherein the mobile communication device receives from the authentication server a challenge, and in response encrypts the challenge using the decrypted private key to generate the token.

12. The mobile communication device of claim 10, wherein the public exponent comprises at least 128 bits.

13. A method comprising employing at least one processor and memory to:
   store at an authentication server a public key of an asymmetric public key cryptography key pair, the key pair including the public key and a private key, the private key including a modulus and a private exponent, the public key including the modulus and a public exponent;
   receive an encrypted token at the authentication server from a mobile communication device connected to the authentication server over a wide area network, the encrypted token being encrypted by the mobile communication device using a decrypted private key, the decrypted private key being generated by decrypting, using a user-entered password, an encrypted private key stored on the mobile communication device in encrypted form;
   in response to verifying at the authentication server that the public key corresponds to the decrypted private key, send to the mobile communication device a confirmation that the user-entered password is correct;
   in response to authenticating, at the authentication server, the mobile communication device as authorized to validate a user login session by a user client computer system on a service provider server, send from the authentication server to the mobile communication device a request for user validation of the user login session on the service provider server;
   in response to sending to the mobile communication device the request for user validation of the user login session, receive at the authentication server from the mobile communication device a user acceptance of the request for user validation of the user login session, the user acceptance indicating a validation by the user of the user login session on the service provider server; and
   in response to authenticating the mobile communication device and receiving the user acceptance, send from the authentication server to the service provider server an indicator of the user's acceptance, for allowing the user client computer system access to a restricted resource on the service provider server.

14. The method of claim 13, wherein the authentication server sends to the mobile communication device a challenge, for generating the encrypted token by encrypting the challenge.

15. The method of claim 13, wherein the public exponent comprises at least 128 bits.

16. The method of claim 13, further comprising marking an identity corresponding to the public key as vulnerable in response to receiving at the authentication server a predetermined number of consecutive unsuccessful attempts to validate user-entered passwords corresponding to the identity.

17. An authentication server computer system comprising at least one processor and memory, wherein the authentication server computer system:
   stores a public key of an asymmetric public key cryptography key pair, the key pair including the public key and a private key, the private key including a modulus and a private exponent, the public key including the modulus and a public exponent;
   receives an encrypted token from a mobile communication device connected to the authentication server over a wide area network, the encrypted token being encrypted by the mobile communication device using a decrypted private key, the decrypted private key being generated by decrypting, using a user-entered password, an encrypted private key stored on the mobile communication device in encrypted, unstructured form;
   in response to verifying that the public key corresponds to the decrypted private key, sends to the mobile communication device a confirmation that the user-entered password is correct;
   in response to authenticating the mobile communication device as authorized to validates a user login session by a user client computer system on a service provider server, send to the mobile communication device a request for user validation of the user login session on the service provider server;
   in response to sending to the mobile communication device the request for user validation of the user login session, receives from the mobile communication device a user acceptance of the request for user validation of the user login session, the user acceptance indicating a validation by the user of the user login session on the service provider server; and
   in response to authenticating the mobile communication device and receiving the user acceptance, sends to the service provider server an indicator of the user's acceptance, for allowing the user client computer system access to a restricted resource on the service provider server.

18. The authentication server computer system of claim 17, wherein the authentication server computer system sends to the mobile communication device a challenge, for generating the token by encrypting the challenge.

19. The authentication server computer system of claim 17, wherein the public exponent comprises at least 128 bits.

20. The authentication server computer system of claim 17, wherein the authentication server computer system marks an identity corresponding to the public key as vulnerable in response to receiving a predetermined number of consecutive unsuccessful attempts to validate user-entered passwords corresponding to the identity.

21. The method of claim 1, wherein the private key consists of the modulus N and the private exponent d.

22. The authentication server computer system of claim 4, wherein the private key consists of a modulus N and a private exponent d.

* * * * *